3,836,490
FLAMEPROOF POLYCARBONATES CONTAINING AN ALKALI METAL SALT SOLUBLE IN THE POLYCARBONATE MELT

August Bockmann, Hans Rudolph, and Werner Nouvertne, Krefeld-Bockum, Germany, assignors to Bayer Aktiengesellschaft, Leverkusen, Germany
No Drawing. Continuation of abandoned application Ser. No. 186,391, Oct. 4, 1971. This application July 20, 1973, Ser. No. 381,101
Claims priority, application Germany, Oct. 8, 1970, P 20 49 358.7; Mar. 17, 1971, P 21 12 987.3
Int. Cl. C08g 51/62
U.S. Cl. 260—18 TN                              6 Claims

ABSTRACT OF THE DISCLOSURE

High molecular weight thermoplastic polycarbonates of low inflammability are provided which contain alkali salts soluble in the polycarbonate melt in amounts of from about 0.2% by weight to about 0.00005% by weight based on the weight of the polycarbonate.

---

This is a continuation of application Ser. No. 186,391, filed Oct. 4, 1971, and now abandoned.

The present invention relates to a new high molecular weight polycarbonate of low inflammability.

Though the known high molecular thermoplastic, halogen-free, polycarbonates of divalent phenols are to be regarded as self-extinguishing plastics, it is known that for some uses of the polycarbonates a higher flameproof character or low inflammability is demanded, and that this can be achieved by a halogen content, for example by the incorporation of halogen-containing compounds, for example tetrachlorobisphenol and/or tetrabromobisphenol, into the polycarbonate molecules. With an increase in content of halogen, however, the processability and mechanical properties, such as, for example, the notched impact strength, deteriorate. The properties mentioned deteriorate as the halogen content increases (compare U.S. Pat. 3,334,154).

For this reason, it is desirable to improve the flameproof character or low inflammability of polycarbonates in a different way.

A way has now been found, surprisingly, in which the low inflammability of polycarbonates can be increased, without having to tolerate unfavourable discolorations.

Thus, the invention provides a high molecular weight thermoplastic polycarbonate of low inflammability, based on aromatic dihydroxy compounds characterised in that they contain 0.2% by weight to 0.00005% by weight, of at least one alkali metal salt soluble in the polycarbonate melt.

Especially the invention provides halogen-free as well as halogen-containing aromatic polycarbonates with the proviso that the halogen-free aromatic polycarbonates contain 0.005% by weight to 0.00005% by weight, preferably 0.001% by weight to 0.0001% by weight and the halogen containing aromatic polycarbonates contain 0.2% by weight to 0.0001% by weight, preferably 0.1% by weight to 0.005% by weight, of at least one alkali metal salt soluble in the polycarbonate melt. These additives yield a transparent polycarbonate in the concentrations mentioned.

Whilst, according to German Offenlegungsschrift 1,-930,257, alkali salts of perfluoroalkanesulphonates can be used to improve the low inflammability of polycarbonates, the requisite amounts of 0.01 to 1% by weight are not completely soluble in the polycarbonates and therefore do not yield transparent polycarbonate mouldings of low inflammability.

Suitable alkali salts for use in the present invention are, for example, potassium isooctanoate, sodium isooctanoate, lithium isooctanoate, potassium perfluorooctanoate, sodium perfluorooctanoate, lithium perfluorooctanoate, the potassium salt of 5-ethyldioxan-1,3-yl-(5)-carboxylic acid, rubidium isooctanoate, and rubidium perfluorooctanoate, the lithium salt of perfluorodecanoic acid, the sodium salt of perfluorodecanoic acid, the potassium salt of perfluorodecanoic acid, the lithium salt of 5-ethyl-dioxan-1,3-yl-5-carboxylic acid, the sodium salt of 5-ethyl-dioxan-1,3-yl-carboxylic acid, the lithium salt of pentachlorobenzoic acid, the sodium salt of pentachlorobenzoic acid, the potassium salt of pentachlorobenzoic acid, di-lithium phosphate, di-sodium phosphate and di-potassium phosphate. Furthermore, the alkali salts of lauric acid, stearic acid, oleic acid, phthalic acid monobenzyl ester, adipic acid monobutyl ester, p-octylbenzoic acid, p-tert.-butylbenzoic acid, 3 - (3,5 - di - tert. - butyl - 4-hydroxyphenyl)-propionic acid and diglycollic acid monodecyl ester can be used according to the invention.

The best flameproofing activity results from the potassium salts.

The salts can be used individually or in combination with one another. They can, optionally, also be used in combination with other additives, for example with nickel compounds.

Suitable halogen-containing polycarbonates are above all those which are synthesized from halogen free aromatic dihydroxy compounds and halogen-containing aromatic dihydroxy compounds, 2,2-(4,4'-dihydroxydiphenyl)-propane, 4,4'-dihydroxydiphenylmethane, 4,4'-dihydroxydiphenylsulphone, 4,4'-dihydroxydiphenyl-ether, 2,2-(3,5,-3',5-tetrachloro-4,4'-dihydroxydiphenyl)-propane, 3,5,3',-5' - tetrachloro - 4,4'-dihydroxydiphenylmethane, 3,3'-dichloro - 4,4'-dihydroxydiphenylmethane, 5-chloro-2'4-dihydroxydiphenylsulphone and 4,4' - dihydroxy - 3,3' - dichloro-diphenylether can be used as dihydroxy compounds. In addition to the copolycarbonates of halogen-free aromatic dihydroxy compounds and halogen-containing aromatic dihydroxy compounds, it is also possible to use mixtures of polycarbonates which consist of homopolycarbonates of bifunctional halogen-containing aromatic dihydroxy compounds and bifunctional halogen-free aromatic dihydroxy compounds.

Suitable halogen-free polycarbonates are those based on the halogen-free aromatic dihydroxy compounds mentioned above and/or those which are manufactured from aromatic dihydroxy compounds such as for example, hydroquinone, resorcinol and/or 4,4'-dihydroxydiphenyl or, generally spoken, from bis-(4-hydroxyphenyl)-alkanes, -cycloalkanes, -sulphide, -sulphoxide, -sulphone, -ketone and -ether.

The alkali metal salts can be added to the polycarbonate during the manufacture of the polycarbonate, or can be added to the melt of the finished polycarbonate, for example in an extruder. If the alkali metal salts are added during the manufacture of the polycarbonate by the phase boundary condensation process, it is particularly advantageous to mix the alkali metal salt or salts, dissolved in an inert solvent, for example in methylene chloride, to the polycarbonate solution before the polycarbonate is isolated.

The polycarbonates can furthermore contain other additives, such as pigments, fillers, dyestuffs, UV-absorbers and stabilisers.

The flame resistant polymers of this invention may be used in any application for which a thermoplastic synthetic material is desirable but particularly in those areas where a flame resistant, high molecular weight, thermoplastic, halogen - containing, Class I, self - extinguishing polymer is desired. For example, the polycarbonates of this invention may be injection molded, extruded or otherwise shaped into helmets, windows, automobile body parts, films, coatings, enamels, fibers and so on.

The invention is further illustrated but is not intended to be limited by the following examples in which all parts and percentages are by weight unless otherwise specified.

The low inflammability is tested in accordance with the following test procedure:

METHOD 1

A test rod, 40 x 15 x 4 mm., is clamped horizontally in such a way that the 15 mm. edge is vertical. The rod is exposed at one end to a 4 cm. high Bunsen burner flame from below, at a distance of 2 cm., for 20 seconds. Thereafter, the burning time of the test specimen is measured. Immediately after it extinguishes, the same test specimen is again exposed to a flame for 10 seconds, and thereafter the burning time is again measured; the process is repeated once more, with 5 seconds' exposure to the flame. The sum of these burning times, taken as an average of 5 different measurements, is treated as a measure of the low inflammability.

METHOD 2

Test specimens of sizes 120 x 10 x 4 mm. are suspended vertically and exposed to a 2 cm. high Bunsen burner flame (without air supply). The distance of the Bunsen burner is 1 cm. The time for which the test rod can be exposed to the flame, in the manner described, without the rod continuing to burn for more than 30 seconds after removal of the ignition flame, and without burning particles dripping off and igniting a cottonwool pad lying under the test rod, is determined.

The relative viscosity of the test specimens (measured in methylene chloride at 25° C., c.=5 g./100 ml.) is indicated to characterise the molecular weight.

The tables which follow contain the results of the experiments and comparison experiments carried out to characterize the present invention.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A flame-resistant high molecular weight thermoplastic polycarbonate based on aromatic dihydroxy compounds and obtained by the phase-boundary condensation process and which contains from about 0.2% to about 0.00005% by weight based on the weight of the polycarbonate of an alkali metal salt of an organic acid which is soluble in the polycarbonate melt selected from the group consisting of lithium isooctanoate, sodium isooctanoate, potassium isooctanoate, the lithium salt of phthalic acid monobenzyl ester, the sodium salt of phthalic acid monobenzyl ester, the potassium salt of phthalic acid monobenzyl ester, the lithium salt of perfluorooctanoic acid, rubidium perfluorooctanoate, the sodium salt of perfluorooctanoic acid, the potassium salt of perfluorooctanoic acid, the lithium salt of perfluorodecanoic acid, rubidium isooctanoate, the sodium salt of perfluorodecanoic acid, the potassium salt of perfluorodecanoic acid, the lithium salt of 5-ethyldioxan-1,3-yl-5-carboxylic acid, the sodium salt of 5-ethyldioxan-1,3-yl-5-carboxylic acid, the potassium salt of 5-ethyldioxan-1,3-yl-5-carboxylic acid, the lithium salt of pentachlorobenzoic acid, the sodium salt of pentachlorobenzoic acid, the potassium salt of pentachlorobenzoic acid, and the lithium, sodium, potassium and rubidium salts of lauric acid, stearic acid, oleic acid, phthalic acid monobenzyl ester, adipic acid monobutyl ester, p-octylbenzoic acid, p-tert.-butylbenzoic acid, 3-(3,5-ditert.-butyl - 4 - hydroxy-phenyl)-propionic acid and diglycollic acid monodecyl ester.

TABLE 1

Copolycarbonate ($\eta_{rel}$=1.26–1.27) of 8 mol. percent of 2,2-(3,5,3'5'-tetrachloro-4,4'-dihydroxy-diphenyl)-propane and 92 mol. percent of 2,2-(4–4'-dihydroxy-diphenyl)-propane was treated with the following additives

| | "Spectral colour density" (PC) | Method 1: Sum of burning times (sec.) | Notes | Method 2: Flame exposure time in seconds |
|---|---|---|---|---|
| 1. None | 7–8 | 32.7 | Drips off | 15–20 |
| 2. 0.02% by weight of potassium iso-octanoate | 5.5 | 14.6 | No drops | 30 |
| 3. 0.005% by weight of potassium iso-octanoate | 5.4 | 14.6 | ...do | 30 |
| 4. {0.01% by weight of potassium iso-octanoate, 0.01% by weight of nickel iso-octanoate} | 6.3 | 3.5 | ...do | 30 |
| 5. {0.005% by weight of potassium iso-octanoate, 0.005% by weight of nickel iso-octanoate} | 5.9 | 4.9 | ...do | 25 |
| 6. 0.02% by weight of manganous iso-octanoate | 14.6 | 20.2 | ...do | 25 |
| 7. 0.005% by weight of potassium perfluorooctanoate | 5.7 | 11.3 | ...do | 25 |
| 8. 0.02% by weight of potassium salt of phthalic acid monobenzyl ester | 6.4 | 13.4 | ...do | 30 |
| 9. 0.02% by weight of lithium salt of 5-ethyldioxan-1,3-yl-5-carboxylic acid | 5.9 | 14.4 | ...do | 25 |
| 10. 0.02% by weight of sodium salt of perchlorobenzoic acid | 6.9 | 14.0 | ...do | 25 |

TABLE 2

Polycarbonate from 2,2-bis-(4-hydroxyphenyl)-propane, manufactured according to the phase boundary process was mixed with the following additives

| Additive | $\eta_{rel}$ | Colour number (PC) | Method 2: Flame exposure time in seconds | Standard notched impact strength | Elongation at break |
|---|---|---|---|---|---|
| None | 1.303 | 0.65 | 10 | 51 | 128 |
| 1 p.p.m. K+ (as potassium isooctanoate) | 1.303 | 0.65 | 12 | 52 | 121 |
| 3 p.p.m. K+ (as potassium isooctanoate) | 1.302 | 0.65 | 20 | 52 | 114 |
| 6 p.p.m. K+ (as potassium isooctanoate) | 1.300 | 0.75 | 25 | 53 | 119 |
| 3 p.p.m. Ni++ (as nickel isooctanoate) | 1.302 | 0.75 | 10 | 55 | 105 |
| 3 p.p.m. Co++ (as cobalt isooctanoate) | 1.298 | 0.55 | 10 | 50 | 112 |
| 3 p.p.m. Na+ (as sodium perfluorooctanoate) | 1.302 | 0.65 | 18 | 51 | 112 |

2. The polycarbonate of Claim 1 which is halogen-free and which contains from about 0.005% to about 0.00005% by weight based on the weight of the polycarbonate of said alkali metal salt of an organic acid which is soluble in the polycarbonate melt.

3. The polycarbonate of Claim 1 which contains halogen atoms in the polycarbonate molecule and from about 0.2% to about 0.0001% by weight based on the weight of the polycarbonate of said alkali metal salt of an organic acid which is soluble in the polycarbonate melt.

4. The polycarbonate of Claim 1 wherein the alkali metal salt is potassium isooctanoate.

5. The polycarbonate of Claim 2 which contains about 0.001% to about 0.0001% by weight of said alkali metal salt.

6. The polycarbonate of Claim 3 which contains about 0.1% to about 0.005% by weight of said alkali metal salt.

References Cited

UNITED STATES PATENTS

| | | | |
|---|---|---|---|
| 3,275,601 | 9/1966 | Schnell et al. | 260—47 |
| 3,313,782 | 4/1967 | Springmann et al. | 260—77.5 D |

DONALD E. CZAJA, Primary Examiner

E. C. RZUCIDLO, Assistant Examiner

U.S. Cl. X.R.

260—45.7 R, 45.85 R, 45.85 T, 47 X A, 77.5 D